(12) United States Patent
Giorgini et al.

(10) Patent No.: US 6,455,605 B1
(45) Date of Patent: *Sep. 24, 2002

(54) FOAMABLE COMPOSITION EXHIBITING INSTANT THIXOTROPIC GELLING

(75) Inventors: Albert M. Giorgini, Lino Lakes; James A. Hagquist, St. Paul, both of MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/841,382

(22) Filed: Apr. 24, 2001

Related U.S. Application Data

(63) Continuation-in-part of application No. 09/148,434, filed on Sep. 4, 1998, now Pat. No. 6,288,133
(60) Provisional application No. 60/058,981, filed on Sep. 10, 1997.

(51) Int. Cl.[7] ................................................. C08G 18/32
(52) U.S. Cl. ...................... 521/163; 521/902; 521/172; 521/173; 238/29; 156/77; 523/130; 523/131
(58) Field of Search ................................. 521/163, 173, 521/902, 172; 238/29; 156/77; 523/130, 131

(56) References Cited

U.S. PATENT DOCUMENTS

| | | |
|---|---|---|
| 3,191,864 A | 6/1965 | Moses |
| 3,716,608 A | 2/1973 | Neumann |
| 4,070,201 A | 1/1978 | Tessenske |
| 4,152,185 A | 5/1979 | Tessenske |
| 4,248,811 A | 2/1981 | Doyle |
| 4,264,743 A | 4/1981 | Maruyama et al. |
| 4,295,259 A | 10/1981 | Rhodes et al. |
| 4,475,847 A | 10/1984 | Cornely |
| 4,661,532 A | 4/1987 | Morin |
| 4,990,586 A | 2/1991 | Case |
| 5,124,367 A | 6/1992 | Barker et al. |
| 5,338,767 A | 8/1994 | Sartelet et al. |
| 5,422,380 A | 6/1995 | Mendelsohn et al. |
| 5,470,515 A | 11/1995 | Grimm et al. |
| 5,476,681 A | 12/1995 | Sampara et al. |
| 5,847,014 A | * 12/1998 | Nodelman et al. |
| 5,886,062 A | 3/1999 | Dietrich et al. |

FOREIGN PATENT DOCUMENTS

| | | |
|---|---|---|
| CA | 2165614 | 8/1996 |
| EP | 0 672 697 A | 9/1995 |
| EP | 0 826 706 A | 3/1998 |
| WO | 89 09096 | 10/1989 |
| WO | 94 14865 A | 7/1994 |

OTHER PUBLICATIONS

Saunders & Friscal; Polyurethanes; Part II, pp. 248–250; 1964.

* cited by examiner

Primary Examiner—Rachel Gorr
(74) Attorney, Agent, or Firm—Bin Su

(57) ABSTRACT

The invention relates to a foamable composition comprising at least two parts. The first part comprises a polyol, a thixotropic gelling agent, a blowing agent, a urethane reaction catalyst and a isocyanurate reaction catalyst. The second part comprises at least one isocyanate. A foam mass can be prepared by combining the first part polyol component with the second part isocyanate component. The composition is foamable under water and exhibits, upon foaming under water, substantially the same wet foam density and dry foam density. The invention also relates to a method of repairing or reinforcing structural members having defects such as spike holes left after spike removal from railroad ties during road bed maintenance or repair by means of the foamable composition.

47 Claims, 2 Drawing Sheets

FOAMABLE COMPOSITION EXHIBITING INSTANT THIXOTROPIC GELLING

CROSS REFERENCE TO THE RELATED APPLICATION

This application is a continuation-in-part of application Ser. No. 09/148,434, filed Sep. 4, 1998, now issued as U.S. Pat. No. 6,288,133, which claims the benefit of U.S. Provisional Application No. 60/058,981, filed Sep. 10, 1997.

FIELD OF THE INVENTION

The invention relates to a foamable composition comprising at least two parts. More specifically, the first part comprises at least one polyol, at least one thixotropic gelling agent, and at least one blowing agent wherein the first part comprises an effective amount of hydrophobic ingredients and a second part comprising at least one isocyanate. A foam mass can be prepared by a method of combining the polyol component with the isocyanate component substantially free of urethane prepolymer and applying the mixture to a void or substrate. The invention also relates to methods of using the foamable composition in the repair of surface defects or for the reinforcement of structural members such as spike holes left after spike removal from railroad ties during road bed maintenance or repair. The invention further relates to a method of foaming the composition in the presence of water.

BACKGROUND OF THE INVENTION

Materials used to repair defects in structural members should have certain characteristics. The material should be easily applied and should form high strength bonds to structural members made of varying materials. Particularly for outdoor repairs, the repair materials should be usable in many environments including environments having extremes of heat and cold and having the presence of substantial quantities of environmental water.

One particularly important end use for such repair compositions is in the recycle or reuse of railroad ties. Typically in the maintenance of the railroad right of way, the rails along with the tie plates and spikes, are removed from railroad ties which remain in the roadbed. If a new rail is to be spiked to the old tie, it is critical that the railroad tie spike holes be repaired prior to laying the new rail. The presence of spike holes in an old tie can cause problems since if a spike is driven into a portion of the tie near an old spike hole, the driving force of the spike can displace the spike from its intended location into an old hole, displacing the rail, tie plate and spike. In the instance that the spike is driven into an incorrect location substantial economic loss can result in repairing the misaligned rail. If a misaligned rail is not repaired, the defect can cause derailment or other problems. Further, the spike holes can be the source of structural weakness in the tie, allowing water to enter the core of the tie accelerating the degradation.

Mechanical spike hole repair means have been suggested in the art. For example, Moses, U.S. Pat. No. 3,191,864, issued Jun. 29, 1965 teaches a mechanical spike hole insert used by first boring out an old spike hole, installing an insert and driving a new spike into the insert. Newman U.S. Pat. No. 3,716,608, issued Feb. 13, 1973 teaches metallic inserts that can be placed in bored out spike holes with a filling of a synthetic resin into which the spikes can be driven. In another area of repair, Tessenski, U.S. Pat. Nos. 4,070,201 and 4,152,185, issued Jan. 24, 1978 and May 1, 1979 respectively, teach a railroad tie spike hole plugging material and method using a substantial uniform mixture of a granular abrasive material and a granular plastic material which is poured into the hole left after spike removal. The driving force of a spike into the abrasive material generates heat which plasticizes the material resulting in a firm bond of the spike to the material. Mechanical and resin-based hole filling methods tend to be time consuming, expensive and adapted to manual, not automatic application or installation.

Rhodes et al., U.S. Pat. No. 4,295,259, issued Oct. 20, 1981, teaches a method of reusing wooden railroad ties in which the old spike holes are filled with a high-density rigid polyurethane foam injected into the holes. At col. 4, lines 14–20, this reference states that "Manufacturers of polyurethane chemicals caution that both components not be allowed to drop below 55° F. (13° C.) at any time, including shipping and storage. Temperatures below 55° F. (13° C.) apparently have a deleterious effect on the properties of the final product. Temperature control during operation is used to regulate viscosity."

Other polyurethane foam compositions have been suggested for other uses. For example, Maruyama et al., U.S. Pat. No. 4,264,743, issued Apr. 29, 1981, teaches a polyurethane foam sealing material prepared from a polyisocyanate and a polyol component, a major portion of said polyol component consisting of polyol derived from a dimer acid or castor oil, or a mixture thereof in the presence of a blowing agent, a foam stabilizer, a catalyst, and optionally, a lipophilic filler. As the catalyst, tertiary amines and organotin compounds are preferably used. The sealing materials are suitable for use in fender, ventilator, air conditioning joints and other parts in automobiles, as well as in ships, refrigerators and other assembly products.

Barker et al., U.S. Pat. No. 5,124,367, issued Jun. 23, 1992 teaches a fire retardant composition comprising a dispersion of solid fire retardant additive in a liquid isocyanate-reactive compound having a functionality of from 2 to 8 and an average equivalent weight of from about 31 to about 5000 and, as an anti-settling agent, an effective amount of a fatty acid ester and/or amide such as castor oil. The anti-settling agent is disclosed in an amount of 0.05 to 5%. The composition is useful in the manufacture of fire resistant flexible and rigid foams.

Grimm et al., U.S. Pat. No. 5,470,515, issued Nov. 28, 1995, teaches insulating pipes by application of at least one insulating layer and at least one outer surface layer by rotational molding. A rigid polyurethane foam is used as the insulating layer while a solid polyurethane is used as the surface layer. The rigid polyurethane foam is obtained by the reaction of a) an aromatic isocyanate with b) a polyol component bearing on average at least 3 isocyanate-reactive hydrogen atoms containing: 1. a polyether containing at least two hydroxyl groups and having a molecular weight of 300 to 700, 2. an aliphatic, cycloaliphatic or aromatic polyamine having a molecular weight of 32 to 1,000 as a crosslinking agent and a blowing agent, and optional ingredients. The solid polyurethane is obtained by the reaction of a) an NCO-terminated prepolymer having an NCO content of 5 to 20% obtained by the reaction of 1) 4,4'-diphenyl methane diisocyanate, optionally admixed with 2,4' and 2,2'-isomers and 0 to 30% by weight components of high functionality with; 2) polyethers containing 2 to 4 OH groups having a molecular weight of 1,000 to 6,000 to which up to 30% by weight of a hydrophobicizing agent, preferably castor oil, has optionally been added with b) a polyol component containing 1) a polyether containing 2 to 4 isocyanate-reactive hydrogen atoms and having a molecular weight of 1,000 to 6,000; 2) 5 to 35% by weight of an aromatic diamine having a molecular weight of 122 to 400; 3) 0 to 5% by weight of an aliphatic or cycloaliphatic diamine having a molecular weight of 60 to 4000; 4) 0 to 30% of a hydrophobicizing agent and 5) optionally auxiliaries and additives.

Doyle et al., U.S. Pat. No. 4,248,811, issued Feb. 3, 1981, teaches equipment and formulations for the filling of ordinary pneumatic tires with a polyurethane foam. Exemplified is a composition wherein component A contains 4,4'-diphenylmethane diisocyanate (MDI) 5 equivalents 665 lbs. and hydroxy-terminated polybutadiene 1 equivalent 1250 lbs. and component B contains hydroxy-terminated polybutadiene 1.1 equivalents 1375 lbs., castor oil 1 equivalent 340 lbs, 1,4-butanediol 1 equivalents 80.1 lbs, silicone surfactant 35 lbs, tertiary amine catalyst 4.5 lbs., lead octoate catalyst 4.5 lbs, and tall oil fatty acid 30.0 lbs. The castor oil is added to compatibilize the polybutadiene.

The use of polyurethane foam in filling spike holes in used railroad ties can present significant problems. The polyurethane foam compositions do not appear to adhere to a spike hole with sufficient adhesion to prevent the accidental removal of the foam repair mass during the repair and subsequent mechanical rail installation. Further, the urethane foams of the prior art tended to foam uncontrollably in the presence of substantial environment moisture. Since moisture tends to accelerate the foaming properties of the urethane composition, the presence of water can cause too rapid of cell expansion resulting in a foam mass of low strength and low density which can result in the formation of an incomplete or unreliable repair of structural members.

Morin, U.S. Pat. No. 4,661,532, issued Apr. 18, 1987, teaches coal tar containing foaming urethane compositions and a method of repairing defects in structural components. A two package hydrophobic urethane foaming composition is disclosed in which the first package comprises a polyol made hydrophobic by the presence of an effective amount of a coal tar or coal tar pitch composition. Although the use of coal tar significantly improved the problems associated with adhesion and uncontrolled foaming of the polyurethane composition in the presence of substantial moisture, this approach has had limited commercial success due to worker safety hazards since coal tar has been identified as a carcinogen. Hence, products were developed in which the coal tar was replaced with a mixture of hydrophobic polyols comprising about 20 wt-% castor oil present in the polyol component. The viscosity of each part of such products is about 2,000 cPs at 77° F. (25° C.), but increases to about 50,000 cPs at 50° F. (10° C.), and in the excess of 100,000 cPs at 40° F. (4° C.). Hence, the coal tar containing compositions as well as the non-carcinogenic modifications were found to be difficult to apply by conventional application equipment without the addition of heat. The recommended application temperature for such products ranged from about 130° F. (54° C.) to about 140° F. (60° C.). As railroad repair becomes a year-round task, rather than seasonal during warmer months of the year, the difficulty in application became quite problematic.

Accordingly, a substantial need exists in the art for foamable compositions employing non-carcinogenic ingredients that can be used to repair surface defects on structural components such as railroad ties to provide a repair mass having strong adhesion to the substrate structural member, which can be used in the presence of substantial quantities of environmental water and can be used in automatic application equipment in all temperatures.

SUMMARY OF THE INVENTION

The invention features a foamable composition that can be foamed in the presence of high concentrations of water. The foamable composition builds viscosity and forms a thixotropic gel sufficiently fast enough that it can be foamed in the presence of environmental water, or even underwater, while still maintaining excellent foam quality such as consistent foam structure, high strength and high foam density. The foamable composition exhibits excellent adhesion to a variety of substrates including plastic, metal and wood, even when such substrates are wet or under water.

In one aspect, the present invention is a foamable composition having at least two parts comprising:
  a) a part A comprising at least one polyol, at least one gelling agent, and at least one blowing agent; wherein the part A comprises an effective amount of hydrophobic ingredients; and
  b) a part B comprising at least one isocyanate.

Preferably, the polyol is castor oil and the gelling agent is a polyamine. Further, the polyurethane composition preferably further comprises at least one plasticizer in part A and/or part B to reduce the viscosity as well as certain catalysts to attain the proper reaction rates after mixing and application. Advantageously, each part exhibits a low viscosity over a wide temperature range, having a Brookfield viscosity of less than about 10,000 cPs at temperature ranging from about 20° F. (−7° C.) to 40° F. (4° C.).

In another aspect, the invention further relates to a foam mass prepared by a method of:
  a) forming a mixture comprising a polyol component comprising at least one polyol, at least one gelling agent, and at least one blowing agent and an isocyanate component substantially free of prepolymer;
  b) applying the mixture to a void or substrate.

In this embodiment, the isocyanate component is preferably substantially free of isocyanate reactants to avoid the formation of a prepolymer which tends to substantially increase the viscosity of the isocyanate component.

In a preferred embodiment the present invention further relates to a foamable composition comprising:
  a) a part A comprising an amount of 30 wt % or greater of at least one hydrophobic polyol, at least one gelling agent, and at least one blowing agent; and
  b) a part B comprising at least one isocyanate.

Another aspect of the present invention is to provide a polyurethane foam composition that is substantially unaffected by variations in the concentration of blowing agent such as water. It is surmised that the hydrophobic agent and moisture form an equilibrium at the exterior surface of the foam limiting the further take-up of moisture.

In yet another aspect, the invention features a foamable composition comprising at least two parts:
  a) a first part comprising at least one polyol; at least one thixotropic gelling agent; at least one blowing agent; at least one urethane reaction catalyst; and at least one isocyanurate reaction catalyst, and
  b) a second part comprising at least one isocyanate.

The composition can be formulated such that the polyol, preferably, does not contain any ester linkage, such as the ester linkage in castor oil or its derivatives. The composition can also be formulated such that there is no hydrophobic ingredient included. Further, the composition can be formulated to exhibit, upon machine mixing the first part and the second part, instant thixotropic gelling so that it is controllably foamable in the presence of a large amount of environmental water, and even under water. The composition can also be formulated to exhibit, upon foaming under water, very high wet foam density that is substantially the same as dry foam density.

In yet another aspect, the invention relates to a method of repair or reinforcement of a structural member comprising the steps of:
a) providing a structural member having a void;
b) providing a foamable composition comprising a mixture of:
i) a first part comprising at least one polyol, at least one gelling agent, and at least one blowing agent; wherein the first part comprises an effective amount of hydrophobic ingredients and
ii) a second part comprising at least one isocyanate;
c) applying the mixture to the void.

The composition initially has a relatively low viscosity upon mixing. However, the applicant surmises that the thixotropic nature of the polyamine causes the composition to attain the proper consistency for good repair or reinforcement almost immediately upon application. Since the consistency of the foam relies on a chemical reaction, the thixotropic nature of the composition, rather than merely the initial viscosity of the blended parts, the composition may be easily applied at temperatures ranging from about −20° F. (−29° C.) to about 120° F. (49° C.).

In yet another aspect, the invention further relates to a method of foaming a polyurethane composition underwater comprising the steps of:
a) providing a substrate submerged in an aqueous environment;
b) providing a polyurethane composition in an applicator having an exit port, said composition comprising:
i) a first part comprising at least one polyol, at least one gelling agent, and at least one blowing agent; wherein the first part comprises an effective amount of hydrophobic ingredients, and
ii) a second part comprising at least one isocyanate;
c) blending the first and second part to form a mixture;
d) submerging the exit port in said aqueous environment;
e) applying the mixture to said substrate.

DETAILED DESCRIPTION OF THE INVENTION

Figure 1:
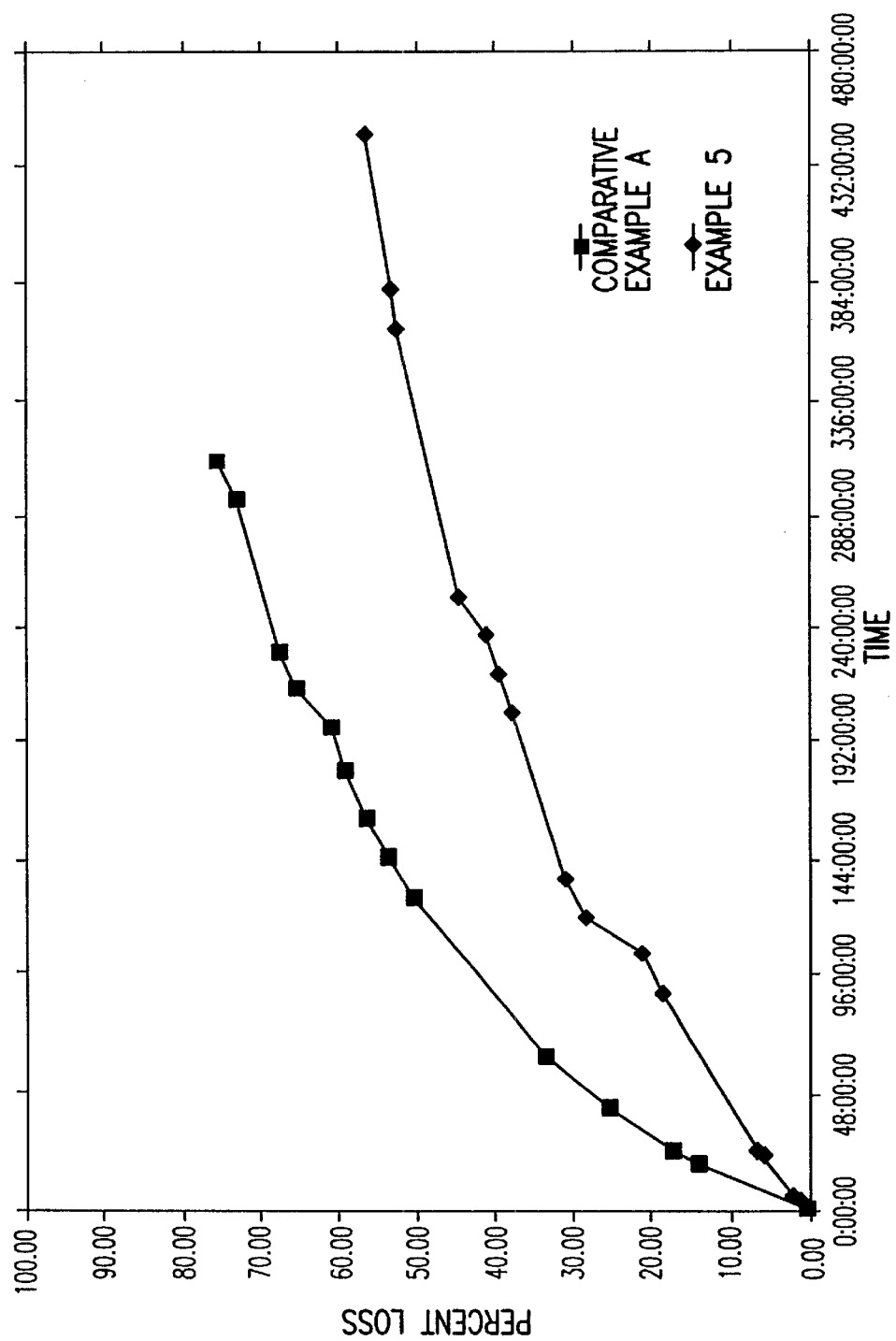
FIG. 1, titled "Ball Mill Demolition Test" depicts the resistance to erosion and impact and abrasion of Example 5 foamed at a density of about 18–22 lb/ft$^3$ (0.29–0.35 kg/dm$^3$) an embodiment in accordance with the present invention and Comparative Example A. The foamable compositions of the present invention exhibit a percent loss 20% lower than Comparative A over the course of time tested representative of a 50% improvement in percent loss at 96 hours and about a 30% improvement at 288 hours.
Figure 2:
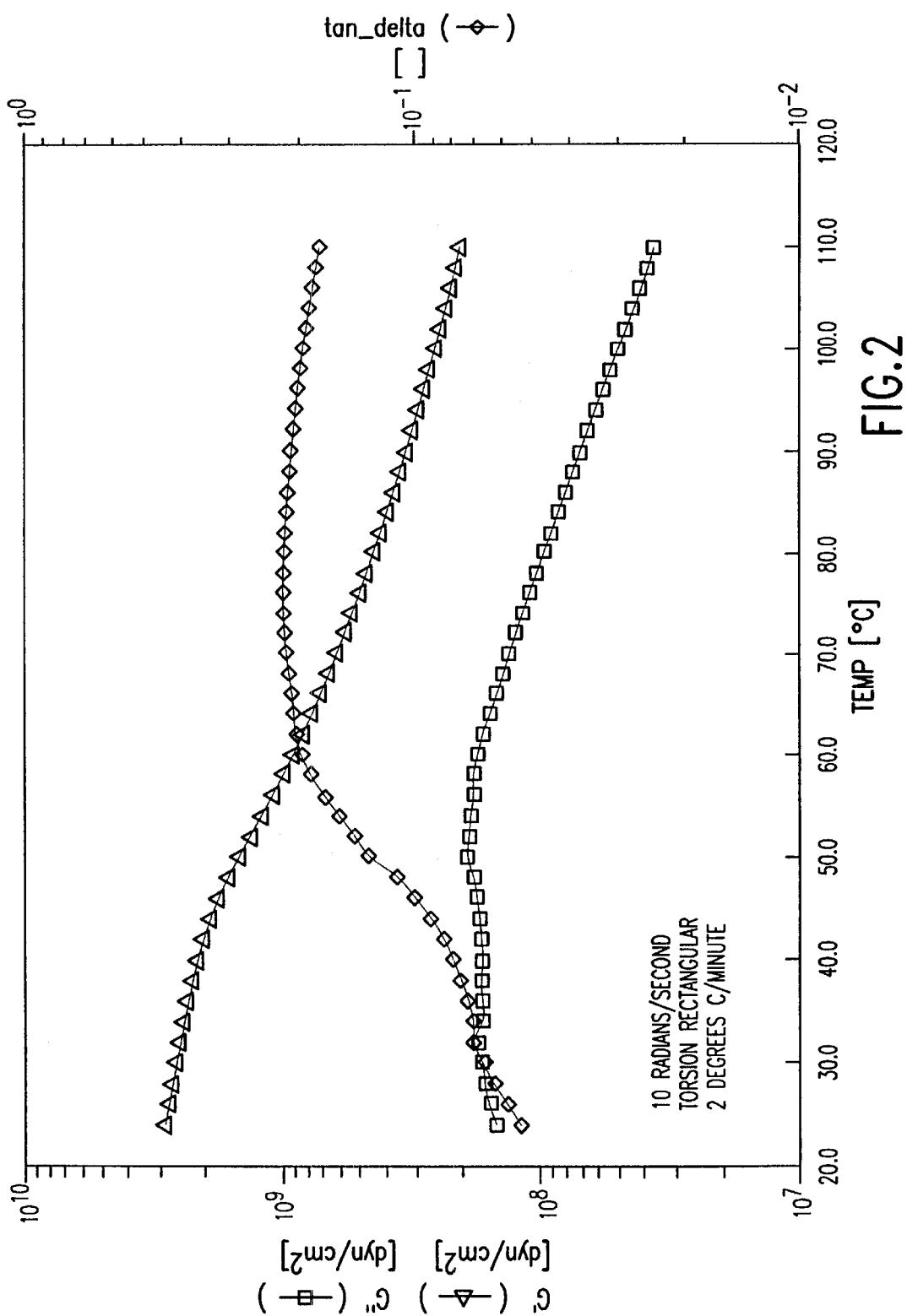
FIG. 2 depicts the storage modulus (G'), loss modulus (G"), and tan delta of Example 5 foamed at a density of about 18–22 lb/ft$^3$ (0.29–0.35 kg/dm$^3$). The G' is related to the strength of the foam. The foamable compositions of the present invention are rigid, having a G' greater than 1×10$^6$ dynes/cm$^2$ over a temperature ranging from 20° C. to 100° C.

The term polyurethane foam as described herein is defined as a polymer containing at least two urethane groups including ureas, isocyanurates and biurets. More specifically, the foam of the present invention is a polyurethane-urea-isocyanurate foam. In other words, the foam formed from the foamable composition of the invention is considered as an isocyanurate-modified polyurethane foam. "Hydrophobic" refers to those ingredients having a concentration of water at ambient temperature of less than 1% after being conditioned for 14 days at 100° F. (38° C.) and 95% relative humidity in a cylindrical container about 4 cm in height having an inside diameter of about 3 cm.

The foamable composition of the present invention comprises at least two parts. Upon mixing the two parts and exposing the mixture to environmental pressures and temperatures, the composition foams. Generally, each part is provided separately and mixed immediately prior to application. However, the invention also contemplates encapsulated ingredients, particularly encapsulated catalysts and/or isocyanates and/or gelling agents. In these embodiments, the composition may be provided as a single mixture.

The first part, part A, or polyol component comprises at least one polyol, at least one thixotropic gelling agent, and at least one blowing agent. The polyol component may comprise an effective amount of hydrophobic ingredients such that the density of the foam differs by no more than 10 lb/ft$^3$ (0.16 kg/dm$^3$), preferably by no more than 5 lb/ft$^3$ (0.08 kg/dm$^3$) when foamed in the presence of water in comparison with being foamed dry. The amount of hydrophobic ingredients in the polyol component, if present, is typically at least about 20 wt %, preferably about 30 wt % or greater, more preferably about 40 wt % or greater, even more preferably about 50 wt % or greater and most preferably greater than about 60 wt %. It is surmised that the relatively high concentration of hydrophobic ingredients in combination with the fast formation of a thixotropic gel is what contributes to the characteristic that the foamable composition is essentially unaffected by high concentrations of water.

Preferably, the polyol component may not comprise hydrophobic ingredients such that the density of the foam differs by no more than 5 lb/ft$^3$ (0.08 kg/dm$^3$), preferably by no more than 3 lb/ft$^3$ (0.05 kg/dm$^3$) when foamed in the presence of environmental water in comparison with being foamed dry. More preferably, the wet foam density of the foam is so high that it is substantially the same as dry foam density.

For the preparation of rigid foams the useful polyol(s), in general, have a weight average molecular weight of from about 50 to about 4000, a functionality of from about 2 to about 8 and a hydroxyl number, as determined by ASTM designation E-222-67 (Method B), in a range from about 14 to about 1800, preferably from about 50 to about 500, and more preferably from about 100 to about 200.

Polyols and methods for their preparation are known. For the purpose of the present invention, a "polyol" is an ingredient having at least two active hydrogen atoms. The term "active hydrogen atom" refers to hydrogens which display activity according to the Zerewitnoff test as described by Kohlerin, *Journal of American Chemical Society*, Vol. 49, pp 31–81 (1927). Useful polyols include polyethers, polyesteramides, polyesters, polythioethers, polycarbonates, polyacetals, polyolefins, and polysiloxanes.

In some embodiments, the preferred polyols are hydrophobic including various grades of castor oil, ricinoleate polyols (highly refined castor oil) and derivatives thereof. Castor oil, also known as ricinus oil, is a triglyceride (ester) of fatty acids derived from the seed of the castor plant. Approximately about 90% of the fatty acid content is ricinoleic acid, an 18 carbon acid having a double bond in the 9–10 position and a hydroxyl group on the 12$^{th}$ carbon. The remainder of castor oil is made up of dihydroxystearic acid (0.7%), palmitic acid (1%), stearic acid (1%), oleic acid (3%), linoleic acid (4.2%), linolenic acid (0.3%) and eicosanoic acid (0.3%). Castor oil is available in a variety of grades from several suppliers.

In some embodiments, the preferred polyols do not contain any ester linkages in the polyol molecule. These polyols include polyethers, polythioethers, hydroxy-terminated polybutadienes, dimer diols, high molecular weight amine terminated polyols such as Jeffamine D-2000 and T-5000. More preferably, the polyols are not hydrophobic.

Other suitable polyols include ethylene glycol, propylene glycol, diethylene glycol, dipropylene glycol, 1,4-butanediol, 1,6-hexanediol and mixtures thereof. The polyol is present in the first part or part A at a concentration ranging from about 5% by weight to about 95% by weight, preferably from about 10% by weight to about 80% by weight, more preferably from about 20% to about 80% by weight, even more preferably from about 40% to about 80%, and most preferably from about 50% to about 80% based on the total weight of the first part (part A). It is surmised that low molecular weight polyol(s) act as hard segments within the polyurethane foam to increase rigidity. Alternatively or in addition to the low molecular weight polyol(s), higher molecular weight polyols may also be employed. Preferably, the polyol component comprises at least one short chain extender to increase toughness. Short chain extenders are known in the art and include polyols such as ethylene glycol, dipropylene glycol, and glycerin.

In addition to or in the alternative, higher functional polyols having more than two hydroxyl groups per molecule may be employed in the part A component. Examples include glycerol, trimethylolpropane, 1,2,4-butanetriol, 1,2,6-hexanetriol and mixtures thereof. The higher functional polyol may be present in the part A component in a range of from about 5% by weight to about 20% by weight, and preferably from about 10% by weight to about 15% by weight based on total weight. Such materials react to provide rigid polyurethane foams having increased crosslinked densities.

The first part (part A) of the composition of the present invention comprises at least one thixotropic gelling agent. Any material which will thicken the mixture, particularly at the interface which contacts the substrate or water, to the extent that the isocyanate component is substantially prevented from reacting with excess environmental water is suitable for use as the thixotropic gelling agent. Preferably, any material that could provide fast or instant thixotropic gelling reaction with the isocyanate in, such as, preferably no greater than about 5 seconds, and more preferably no greater than about 3 or 2 seconds is more suitable in the application of the invention. Useful thixotropic gelling agents include peroxides, polyamides, and preferably polyamines. The polyamine is typically a primary or secondary amine and present in the first part (part A) component, in some embodiments, in an amount of from about 0.1% by weight to about 10% by weight, preferably from about 0.1% by weight to about 5% by weight, more preferably from about 0.5% by weight to about 2% or about 3% by weight, based on the total weight of the polyol component.

Surprisingly, in some preferred embodiments, when relatively large amount, such as, an amount of from greater than about 10 wt % to about 25 wt %, preferably from about 12 wt % to about 15 wt %, based on the total weight of the first part, of a thixotropic gelling agent such as a polyamine, is used together with polyols that, preferably, do not contain an ester linkage or are not hydrophobic, the resultant foams show such a high wet foam density that it is substantially the same as dry foam density.

Upon mixing the part A and part B components, the composition typically thixotropically gels fast within 1 minute, preferably in about 15 seconds or less, more preferably in about 10 seconds or less, even more preferably in about 5 second or less, and most preferably, in about 3 to about 2 seconds or less, when mixed and applied by meter-mix application equipment, i.e., by automated application machine. The composition also crosslinkingly gels fast, preferably, from about 10 seconds to about 60 seconds and more preferably in no greater than about 30 seconds once it is thixotropically gelled.

It is surmised that in the absence of a thixotropic gelling agent, there tends to be a substantial difference in the foam density achieved at dry conditions in contrast to wet conditions. Since water is a common blowing agent, the rate of expansion of foamable compositions typically directly relates to the concentration of water present. Hence, as the concentration of water increases, polyurethane compositions in the absence of the thixotropic gelling agent tend to froth, rather than produce a consistent foam. It is also surmised that the polyamine acts as a chemical thixotrope to provide an instant thixotropic gel once the two parts are blended together. It is further surmised that the instant formation of a thixotropic gel, e.g., within a few seconds, enhances the sealing characteristics of the resultant foam. For example, vacant spike holes often create voids within a railway tie that can pass completely through the tie. As the two parts of the foamable composition are mixing and simultaneously injecting into the hole, the fast or instant thixotropic gelling action provided by the thixotropic gelling agent such as polyamines, preferably, polyamines which could provide the desired thixotropic gelling, allows the composition to more rapidly adhere to the inner surface of the hole, as well as more adequately seal the hole upon foaming within the void. In the absence of the appropriate thixtropic gelling agent, the composition is more likely to flow through the hole and/or cracks and provide an inadequate seal once foamed. Alternatively, in the absence of a thixotropic gelling agent, the ingredients for each part may be selected such that the composition is sufficiently high enough in viscosity upon mixing the part A with the part B. However, this is much less desirable since the initial high viscosity causes the composition to be more difficult to apply consistently, particularly at low application temperatures.

The structure or type of polyamine is selected on the basis of the desired thixotropic gel rate. In general, the polyamine may be monomeric or polymeric, having a functionality of 2 or greater. Linear aliphatic polyamines result in the fastest rate of thixotropic gelation, thus, are the most preferred, whereas cycloaliphatic polyamines produces a slightly slower thixotropic gel rate and aromatic polyamines even slightly slower. However, even the relatively "slow" aromatic polyamine results in the formation of a thixotropic gel in less than about 15 seconds when applied by meter-mix equipment. For automated application means, aliphatic and cycloaliphatic polyamines are preferred whereas the aromatic polyamines are preferred for hand applied application equipment. Preferably, the molecular weight of the polyamine ranges of from about 100 grams/mole to about 400 grams/mole. Examples of useful polyamines include ethylene diamine, toluene diamine, diaminodiphenylmethane and polymethylene polyphenylene polyamines; polyamides and aminoalcohols, for example, ethanolamine and diethanolamine. Preferred aromatic amines include 4,4'-diamino-diphenyl methane, 3,5-diethyl-2,4-toluene diamine (DETDA), and Hardener HY-450, a 4,4'-methylene bis (2-ethyl-benzamine) available from Vantico. For faster thixotropic gel rates cycloaliphatic amines such as Amicure PACM, a bis-(p-aminocyclohexyl) methane, available from Air Products and Chemicals & Inc. are preferred, whereas linear aliphatic amines such as JeffamineD-230, D-400, and T-403 available from Huntsman Chemical Corp (Houston, Tex.) are surmised to thixotropically gel the fastest, thus, the most preferred.

In some embodiments, the foamable composition as a whole necessarily comprises at least about 20% by weight of hydrophobic ingredients to be foamable in the presence of environmental water. In these instances, the amount of hydrophobic ingredients is preferably greater than about 30%, more preferably greater than about 40%, even more preferably greater than about 50% and most preferably about 60% by weight or greater. In the embodiments wherein the hydrophobic ingredient(s) are primarily contributed by the polyol portion, the first part (part A) comprises at least about 50% by weight, preferably at least about 60% by weight, and more preferably from about 70% to about 95% by weight hydrophobic ingredients, based on the total weight of part A. The polyol itself may be the sole hydrophobic component, as in the case wherein relatively high concentrations of castor oil are employed and/or additional hydrophobic ingredients may be employed. Examples of additives that have hydrophobic nature include end use performance modifiers such as monofunctional alcohol e.g. dinonyl phenol and monofunctional long chain aliphatic hydrocarbon e.g. Alfol 1214 from Condea Vista Company. Additional hydrophobic agents include fuel oils such as diesel fuel, paraffin waxes, animal or vegetable oils, and the like.

In these embodiments, the high concentration of hydrophobic ingredients in combination with the thixotropic gelling agent allows the foamable composition to be injected into an aqueous environment. For example, vacant spike holes often contain pooled water. Since water can act as a blowing agent, any excess amount of water in the environment would increase the uncontrollable foaming, thereby, decreasing the wet foam density of the resultant foam, especially when foaming is carried out in the presence of large amount of environmental water such as pooled water. As a result, the foam density difference between wet foam density and dry foam density could become so big that it can be detrimental. Foamable compositions having increased hydrophobicity are less likely to emulsify and/or entrap water that can also result in reducing the foam rigidity and adhesion characteristics.

In some preferred embodiments, the foamable composition as a whole does not necessarily comprise a substantial amount of, or any amount of hydrophobic ingredient that is used solely for the purpose of foaming in the presence of environmental water, i.e., any hydrophobic ingredient that, in combination with the thixotropic gelling agent, could substantially help the composition foam in the presence of environmental water in the manner as the invention does. In another word, the hydrophobic ingredients are not required to present in the composition so that the composition is foamable in the presence of a large amount of environmental water, even under water, while still possesses the required foam properties. In the absence of the hydrophobic ingredient(s), the composition can still be injected into an aqueous environment, and exhibits excellent foam density properties. In these instances, the composition is formulated to still exhibit, upon foaming under water, reduced foam density difference between wet foam density and dry foam density. More preferably, the composition is formulated to exhibit very high wet foam density that it is substantially the same as dry foam density.

Hydrophobic ingredients that are used solely for the purpose of foaming in the presence of environmental water are different from some optional additives which may be in hydrophobic nature. One example of such additives is dinonyl phenol as end use performance modifier. Optional additives, if present, are used in small amounts and for the purpose(s) other than solely providing, in combination with the thixotropic gelling agent, the composition the ability to foam in the presence of environmental water in the manner as the invention does. For example, a small amount of optional dinonyl phenol may be used in some preferred embodiments to improve the end use performance of the foam, such as the long term stability of the foam under use, e.g., when used for repairing the rail road spike holes under the natural environmental conditions including very wet environment years around.

The foamable composition of the present invention comprises at least one blowing agent typically present in the first part (part A) component. The preferred blowing agent is water which is added at an amount ranging from about 0.15% by weight to about 1% by weight, and preferably from about 0.15% by weight to about 0.5% by weight, based on the total weight of Part A. In many instances, the polyol component and/or hydrophobic ingredients contain a small concentration of residual moisture or water at a sufficient concentration to act as a blowing agent. Accordingly, the blowing agent may be inherently present and thus need not be separately added.

The foamable composition of the present invention comprises at least one isocyanate, employed in the second part or part B component. Any of a wide variety of organic polyisocyanates compositions may be employed in the isocyanate component, including monomeric and/or polymeric polyisocyanates which may be linear, branched, cyclic aliphatic polyisocyanates, cycloaliphatic polyisocyanates, aromatic polyisocyanates, isocyanate-terminated prepolymers, and mixtures thereof. Representative examples include 2,4-toluene diisocyanate (TDI), diphenyl methane diisocyanate (MDI), m-phenylene diisocyanate, 4-chlor-1,3-phenylene diisocyanate, 4,4'-biphenyl diisocyanate, 1,5-naphthalene diisocyanate, 1,4-tetramethylene diisocyanate, 6-hexamethylene diisocyanate, 1,10-decamethylene diisocyanate, 1,10-decamethylene diisocyanate, 1,4-cyclohexylene diisocyanate, 4,4'-methylene-bis(cyclohexyl isocyanate) and others. Further, the isocyanate compound may contain other substituents which do not substantially detract from the reactive natures of the isocyanate groups. It is preferred to use a blend of two or more isocyanates wherein at least one of the isocyanates is aromatic. Aromatic diisocyanates, those which have at least two isocyanate groups directly attached to an aromatic ring, react in the urethane reaction more rapidly with polyols than the aliphatic isocyanates. The preferred isocyanates are polymeric MDIs including polymethylene polyphenyl isocyanates such as 4,4'-methylene bisphenyl isocyanate, commercially available as PAPI 27, PAPI 20, PAPI 901 and PAPI 94 from The Dow Chemical Company, Midland, Mich.; as Rubinate M, Rubinate 9257, and Rubinate 9258 from ICI; and as Modur MR, MR-2, and MRS-10 from Bayer. Preferably, the isocyanate component is substantially free of isocyanate reactants to avoid the formation of a prepolymer that tends to substantially increase the viscosity of the isocyanate component.

The isocyanate may be present alone in the second part (part B) component, i.e., in the amount of as high as about 100% by weight. Preferably, the isocyanate is employed in combination with at least one plasticizer and/or other optional additives. Hence, the isocyanate is employed, preferably, at a concentration from about 85% by weight to about 99% by weight, and more preferably from about 94% by weight to about 97% by weight based on total weight of the part B.

At least one plasticizer is preferably used in the polyol component (part A) and/or isocyanate component (part B) to enhance the flow characteristics by reducing the viscosity. Suitable plasticizers include polymeric resins, elastomers, waxes, oils and mixtures thereof. Specific examples include phthalate esters, alkyl phosphates, polyphenyls, di- and triphenyl compounds as well as partially hydrogenated versions, aromatic oils, chlorinated waxes or paraffins, adipate esters, synthetic rubber polymer, natural oils, rosin and rosin derivatives, and polysulfide rubber. Preferred plasticizers include Eastman TXIB Plasticizer (Eastman Chemical Company, Kingsport, Tenn.), a 2,2,4-trimethyl-1,3-pentanediol diisobutyrate plasticizer. The plasticizer may be present in either part in a range of from about 1% by weight to about 25% by weight, and preferably from about 5% by weight to about 10% by weight, with respect to the total weight of each part. The addition of a plasticizer to the part A and/or part B components is preferred to improve the flow characteristics during the railroad tie repair operation.

Preferably the ingredients are selected to lower the crystallization temperature of each component to improve the freeze-thaw stability. For example, the railroad industry repairs tracks year round, and fluctuations in temperature, especially during low temperatures, prefer that each part flow without additional heat at reduced temperatures. Additionally, the isocyanate used in the part B component may tend to crystallize under cooler temperatures so the addition of a plasticizer allows enhanced processing characteristics.

The viscosity of each part of the foamable composition of the present invention is preferably as low as possible at as low of a temperature as possible. Accordingly, each part of the foamable composition of the present invention has a (24 hours) viscosity of less than about 10,000 cPs, preferably less than about 5,000 cPs, more preferably less than about 2,000 cPs, and most preferably less than about 1,000 cPs at a temperature of about 50° F. (10° C.) or less. Preferably, each part of the foamable composition exhibits the desired viscosity at a temperature of less than about 40° F. (4° C.), more preferably at less than about 30° F. (−1° C.) and most preferably at about 20° F. (−7° C.) or less. The foamable composition of the invention is preferably applied at a temperature at which the viscosity is about 1,000 cPs or less. Due to the relatively flat viscosity curve, the composition of the invention is more user friendly, being able to be applied over a relatively wide temperature range. For the best results, the composition is applied at a temperature from about 70° F. (21° C.) to about 100° F. (38° C.), with about 90° F. (32° C.) being most preferred.

In order to be applied over a wide temperature range and not require any special handling, it is preferred that each part of the foamable composition exhibits freeze-thaw stability, i.e., freezing and re-thawing of each part has no substantial detrimental effect on the processability and/or the properties of the resulting foam. Preferably, each part is a stable liquid at temperatures below 30° F. (−1° C.), more preferably below 10° F. (−12° C.), even more preferably below 0° F. (−18° C.), even more preferably at about −10° F. (−23° C.) or less, and most preferably at about −20° F. (−29° C.) or less.

The foamable composition of the invention also includes catalysts. The rate of reaction of the composition of the invention after mixing the polyol component with the isocyanate component can be accelerated by the incorporation of effective amounts of catalysts to promote the desired reactions such as active hydrogen atom/isocyanate reaction, and isocyanurate trimerization reaction. Suitable catalysts include those that are known to enhance the polyol/isocyanate reaction, water/isocyanate reaction, urethane/isocyanate reaction, urea/isocyanate reaction, and isocyanurate trimerization reaction. Preferably, a combination of catalysts is employed to accelerate formation of urethane linkages as well as the isocyanurate linkages. It is surmised that the resultant foam is comprised of a variety of linkages including isocyanurate, biuret and urea linkages rather than predominantly urethane linkages.

Catalysts are typically employed in an amount of from about 0.1% by weight to about 5% by weight, and preferably from about 0.3% by weight to about 3% by weight, based on the total weight of part A. Catalysts include organic amine compounds, organo metallic compounds, and mixtures thereof, which are typically present in the polyol component (Part A) for stability purposes. Further, catalysts may be employed in combination with various accelerators and/or curing agents such as Lewis Base catalysts including ANCAMINE K.54, a tris-(dimethylaminomethyl) phenol from Air Products and Chemical, Inc.

Organic amine compounds based catalysts differ from the polyamine thixotropic gelling agents with respect to the number of reactive sites present in the molecule as well as the concentration employed. Whereas amine based catalysts are typically tertiary amines, the polyamine thixotropic gelling agent is typically a primary or secondary amine. Hence, the polyamine thixotropic gelling agent acts as a reactant that reacts with the isocyanate to form the foam while amine based catalysts are added to accelerate the reactions of the polyol with isocyanate.

Specific examples of useful catalysts to promote the urethane reaction include dibutyltindilaurate, stannous octoate, tertiary aliphatic, and tertiary alicyclic amines such as triethylamine, triethanolamine, tri-n-butylamine, triethylenediamine, alkylmorpholene. Complex mixtures of such catalysts and modified forms may also be employed. Commercially available examples include DABCO 33 LV (triethylene diamine in DPG (33/67)), and DABCO T-120 (organo tin catalyst (17.5% tin)) from Air Products & Chemicals, Inc. (Allentown, Pa.).

For the promotion of the isocyanurate reaction, preferred catalysts include Polycat 41 (N,N,N',N',N",N"-hexamethyl-1,3,5-triazine 1,3,5 (2H, 4H, 6H tripropanamine)), Polycat 43 (a proprietary tertiary amine), and various catalysts based on potassium salts of organic acids such as DABCO T-45 (potassium octonate in dipropylene glycol (DPB) (60/40)), DABCO K-15 (potassium octonate in DPG (70/30)), and Polycat 46 (potassium acetate in ethylene glycol). The Polycat and DABCO catalysts are supplied by Air Products & Chemicals, Inc. More preferred are combinations of isocyanurate reaction catalysts. For example, a slower reacting trimer catalyst, i.e., isocyanurate reaction catalyst, such as DABCO TMR-2, DABCO TMR-3 (quaternary ammonium salts), or DABCO TMR-30 (2,4,6-tris (dimethylaminomethyl) phenol) may be employed, preferably, in combination with a stronger trimer catalyst. More preferably, a combination of isocyanurate reaction catalysts such as a strong trimer catalyst and a small amount of urethane reaction catalyst, such as DABCO 33 LV (triethylene diamine in DPG (33/67)) and/or a metal based catalyst like DABCO T-120 may also be employed. These catalyst systems are described in more detail in U.S. Pat. No. 5,556,934 issued Sep. 17, 1996, incorporated herein by reference.

Other characteristics of the polyurethane foam can be modified with additives commonly used in polyurethane foam compositions including fillers and extenders as well as ultraviolet (UV) stabilizers, antioxidants, fungicides, bactericides, surfactants, dyes and mixtures thereof.

The foamable composition can be made in accordance with known manufacturing methods. The polyol component and isocyanate component are individually prepared using commonly available blending and mixing techniques. The two-part foamable composition is most effectively used by mixing and applying the composition using automated impingement equipment that blends the two parts, or two packages at an appropriate blend ratio. For example, the two components can be meter mixed together at a blend ratio based on a schoichemitric ratio of isocyanate groups (NCO) in part B to active hydrogen atoms (OH) in part A is from about 1 to about 4, preferably, from about 1.5 to about 4, and more preferably from about 2 to about 4. Hence, excess isocyanate is preferred. Practically, two parts or packages are more conveniently blended at a blend ratio of preferably about 1:1 by volume. It is an advantage that the foamable composition can be formulated to have a wide tolerance for the deviation of the blend ratio due to accidental machine malfunction, i.e., the blend ratio can be inadvertently off the ratio during the operation up to about 50% from the setting blend ratio, without losing its physical performance properties or adhesion to the substrates.

In the repair of a railroad tie, the composition of the invention is preferably preheated to a temperature ranging from about 80° F. (27° C.) to about 120° F. (49° C.) and applied into the spike hole using an automatic mixing and application unit that is part of a track repair process that can remove the spike and spike plate, lift or replace the railroad tie, and repair the spike holes using the polyurethane composition of the invention, followed by replacement of the spike plate and rail and respiking the assembly together.

The foamable composition of the present invention is also useful for reinforcement of composite structural members including building materials such as doors, windows, furniture and cabinets and for well and concrete repair. The composition can be used to fill any unintended gaps, particularly to increase the strength. Structural components are formed from a variety of materials such as wood, plastic, concrete and others, whereas the defect to be repaired or reinforced can appear as cuts, gaps, deep holes, cracks, etc. The foamable composition of the present invention is also surmised to be useful for other applications where forming foam in an aqueous environment is of importance as for example in the repair of cushioning for docks.

A foam mass can be prepared by combining the polyol component, being substantially free of urethane prepolymer, with an isocyanate component. The foam may be open or closed cell exhibiting a uniform cell structure which may collapse on the surface forming a skin. Further, the resulting foam, particularly for use in railroad repair, can be characterized as follows:

|  | Useful | Preferred | More Preferred |
| --- | --- | --- | --- |
| Foam Density | >5 lb/ft$^3$ | >10 lb/ft$^3$ | 15–30 + lb/ft$^3$ |
| Strength (G') | >1 × 10$^6$ dynes/cm$^2$ | >1 × 10$^7$ dynes/cm$^2$ | >1 × 10$^8$ dynes/cm$^2$ |
| Demolition Test (96 hours) | <40% loss | <30% loss | <20% loss |

Even more preferably, the foam density is from about 25 lb/ft$^3$ to about 35 lb/ft$^3$, and most preferably, from about 30 lb/ft$^3$ to about 50 lb/ft$^3$. In preferred embodiments, the wet foam density does not change substantially, or remains substantially the same when foamed in wet environment, e.g., in the presence of environmental water or even under water in comparison to foaming in dry conditions. In some other embodiments, the difference in foam density is preferably no greater than about 10 lb/ft$^3$ (0.16 kg/dm$^3$), more preferably no greater than about 5 lb/ft$^3$ (0.08 kg/dm$^3$), and most preferably no greater than about 3 lb/ft$^3$ (0.05 kg/dm$^3$).

Test Methods

Melt Viscosity

Melt viscosity is determined in accordance with the following procedure using a Brookfield Laboratories DVII+ Viscometer. The spindle used is a RV Spindle Set, suitable for measuring viscosities in the range of from 10 to 100,000 centipoise. The viscometer apparatus is lowered and the spindle submerged in the sample tested. Lowering is continued until the spindle line is atop the sample. The viscometer is turned on, and set to a shear rate that leads to a torque reading in the range of 30 to 60 percent. Readings are taken every half minute for about 2 minutes, or until the values stabilize, which final reading is recorded.

The initial viscosity is tested immediately after preparation of the polyol or isocyanate component and is often considerably higher than the viscosity after 24 hours. The viscosity after 24 hours is representative of the viscosity during usage. Hence reference to viscosity refers to the 24 hour viscosity unless stated otherwise.

Density or Dry Density is determined either by a water displacement method or by foaming the composition directly into an empty container of a known mass and volume.

Wet Density is determined by the same method as the dry density except that the composition is foamed directly into a water bath or a water-filled container.

Dynamic Mechanical Analysis

A temperature sweep was conducted in accordance with ASTM-D4440-93 on the foam employing torsion rectangular geometry and a frequency of 10 radians/second and a temperature ramp of 2° C./minute. The storage modulus (G'), loss modulus (G") and tan delta were plotted over the desired temperature range.

Ball Mill Demolition Test

The test is used to determine the resistance to erosion by impact and abrasion. The results are expressed as a percent loss after a period of time, typically after 100 hours. A ball mill of the type commonly used to grind pigments is employed having an external dimension of approximately 5.5"±2" in height having a 5.5"±1" diameter. The ball mill contains thirty-three rounded cylindrical balls approximately ¾"±¼" in height and ¾"±¼" in diameter. Ten plugs of the sample to be tested are prepared which are similar in size to balls in the ball mill. The total weight of the sample plugs is recorded to the nearest 0.1 gram. Predust the clean ball mills balls with small pieces of the sample to be tested for at least 2 hours. Empty the ball mill of all dust that can easily be shaken out. Place the sample plugs along with dusted balls into the ball mill. Seal and roll the ball mill on a paint roller or similar device at 50 rpm±5 rpm. Every 12–24 hours, stop the ball mill, remove the plugs, blow off any dust that can be removed with compressed air and weight the samples to the nearest 0.1 gram. Determine the percent loss by subtracting the eroded weight from the initial weight and dividing the difference by the initial weight× 100%.

EXAMPLES

All the examples were prepared in accordance with the following general procedure:

The "polyol" as part A or first part component is prepared by adding all the ingredients to a Cowles dissolver at room temperature and agitating until the mixture is completely homogeneous. For examples that include small concentrations of catalysts or other ingredients, it is also advantageous to make a preblend of the polyamine and the ingredient employed in small concentrations.

If a single isocyanate is employed without any other ingredient no additional preparation is required. In the instances when the "Iso", i.e., part B, or second part also comprises a plasticizer mixed or reacted with the isocyanate, the ingredients are added to a Cowles dissolver and agitated until the mixture is completely homogeneous.

Each part is packaged separately in an appropriate manner.

Tables I–IV represent various "polyol" or part A components whereas Table V represents several "Iso" or part B components. The castor oil, hydroxyl terminated polybutadiene resin, and dinonylphenol (a monofunctional alcohol) are hydrophobic ingredients, whereas the polyether polyols, short chain extenders, isocyanates and Eastman TXIB plasticizer are not hydrophobic. The present invention encompasses all possible combinations of polyol components and isocyanate components in accordance with the claims.

The following observations and or physical properties were obtained upon combining the polyol component and isocyanate component at a mix ratio of 1:1 by volume.

All parts, percentages, amounts, ratios are by weight unless otherwise specified.

Example 1

Polyol 1 was reacted with Iso B resulting in a foam having a wet density at 120° F. (49° C.) of 16 lb/ft$^3$ (0.26 kg/dm$^3$) and a dry density of 27 lb/ft$^3$ (0.43 kg/dm$^3$).

Example 2

Polyol 6 was reacted with uncompounded PAPI 27 isocyanate producing a foam.

Example 3

Polyol 8 was reacted with Iso H resulting in a gel time of 15 seconds and a foam density of 23 lb/ft$^3$ (0.37 kg/dm$^3$).

Example 4

Polyol 9 was reacted with Iso K and placed in a mold. The samples were put in an oven for 2 hours at 158° F. (70° C.). The sample was then Azod impact tested resulting in an average strength of 0.228 ft lb. (−blank 0.045)=0.183 ft lb.

Example 5

Polyol 11 was modified decreasing the castor oil content by 1 wt %, increasing the Dabco T-120 catalyst to 1.2 wt %, increasing the Ancamine K-54 to 0.4 wt %, and replacing the HY-450 aromatic amine with Amicure PACM. The polyol had an initial viscosity of 1200 cPs, and a 24 hour viscosity of 250 cPs. The polyol was reacted with Iso K to produce a foam.

The viscosity profile for the polyol component and Iso component was as follows:

|  | Part A/Polyol | Part B/Iso |
| --- | --- | --- |
| 20° F. (−7° C.) | 6000 cPs | 10,000 cPs |
| 30° F. (−1° C.) | 3500 cPs | 5000 cPs |
| 40° F. (4° C.) | 2000 cPs | 2500 cPs |
| 50° F. (10° C.) | 1000 cPs | 1250 cPs |
| 60° F. (16° C.) | 500 cPs | 500 cPs |

Example 6

Polyol 14 was reacted with Iso A to produce a foam having an initial wet density of 24.1 lb/ft$^3$ (0.386 kg/dm$^3$) and a dry density of 28.1 lb/ft$^3$ (0.450 kg/dm$^3$). The next day another foam sample was made in which the wet density was 21.1 lb/ft$^3$ (0.338 kg/dm$^3$) and the dry density was 24.4 lb/ft$^3$ (0.390 kg/dm$^3$). The viscosity of the polyol component was 310 cPs initially and stable at 260 cPs after 1 and 2 days. The moisture content of the polyol component was measured to be 0.4319% initially, 0.4012% after 1 day and 0.3649% after 2 days.

Example 7

Polyol 14 was modified by replacing 3 wt % of the castor oil with 3 wt % ethylene glycol and reacted with Iso A to produce a foam having an initial wet density of 14.5 lb/ft$^3$ (0.232 kg/dm$^3$) and a dry density of 21.9 lb/ft$^3$ (0.350 kg/dm$^3$). The next day another foam sample was made having a wet density of 20.3 lb/ft$^3$ (0.325 kg/dm$^3$) and a dry density was 24.6 lb/ft$^3$ (0.394 kg/dm$^3$). The viscosity of the Iso component was 140 cPs initially and stable at 120 cPs after 1 and 2 days.

Example 8

The modified Polyol 14 of Example 7 was also reacted with Iso K producing a foam having an initial wet density of 16.0 lb/ft$^3$ (0.256 kg/dm$^3$) and a dry density of 21.5 lb/ft$^3$ (0.344 kg/dm$^3$). The next day another foam sample was made having a wet density of 16.7 lb/ft$^3$ (0.267 kg/dm$^3$) and a dry density was 22.5 lb/ft$^3$ (0.360 kg/dm$^3$). The viscosity of the polyol component was consistent with Example 5 in that the viscosity decreased slightly within the first 24 hours and then stabilized accompanied by a decreasing moisture content trend. Surprisingly the change and moisture content had essentially no effect on the foam density.

Example 9

Polyol 16, having an initial viscosity of 270 cPs was reacted with Iso K producing a foam.

Example 10

Polyol 22 was reacted with Iso K producing a foam.

Example 11

Polyol 23 was reacted with Iso J resulting in a foam having a wet density of 18.2 lb/ft$^3$ (0.291 kg/dm$^3$) and a dry density of 29.0 lb/ft$^3$ (0.464 kg/dm$^3$).

Examples 12–17

Polyol 25, having a initial viscosity of 2000 cPs was reacted with uncompounded PAPI 27 isocyanate resulting in a 20 second gel rate. The composition was used to produce foam under dry conditions with railroad tie test equipment available from Tamper at temperatures ranging from ambient temperature (77° F. (25° C.)) to 125° F. (52° C.) under a variety of test conditions as follows.

| Pressure | Nozzle | Temp. (° F.) | Density (lb/ft³) |
|---|---|---|---|
| standard | #20 | 115 (46° C.) | 24.9 (0.398 kg/dm³) |
| standard | #40 | 120 (49° C.) | 24.4 (0.390 kg/dm³) |
| standard | #20 | 125 (52° C.) | 26.6 (0.426 kg/dm³) |
| 40 lbs. | #30 | 120 (49° C.) | 25.6 (0.410 kg/dm³) |
| standard | #40 | 77 (25° C.) | 31.5 (0.504 kg/dm³) |
| 50 lbs. | #30 | 125 (52° C.) | 26.7 (0.427 kg/dm³) |
| standard | #30 | 125 (52° C.) | 26.7 (0.427 kg/dm³) |
| standard | #30 | 125 (52° C.) | 25.5 (0.408 kg/dm³) |
| standard | #20 | 77 (25° C.) | 29.2 (0.467 kg/dm³) |
| standard | #15 | 77 (25° C.) | 32.4 (0.518 kg/dm³) |

The foam density was found to be very consistent throughout this temperature range, particularly when the same size nozzle was employed.

Jeffamine D-400 and T-403 were added individually to Polyol 25 and reacted with uncompounded Papi 2027 isocyanate to decrease the crosslinking gel rate as follows:

| Jeffamine D-400 | Jeffamine T-403 |
|---|---|
| 1 wt-%-14 seconds | 1 wt-%-13 seconds |
| 2%-13 seconds | 2%-12 seconds |
| 3%-11 seconds | 3%-11 seconds. |

Example 18

Polyol 29, having an initial viscosity of 490 cPs, was reacted with Iso F, having an initial viscosity of 470 cPs resulting in a foam having a density of 13.5 lb/ft³ (0.216 kg/dm³) at 120° F. (49° C.) and a density of 12.7 lb/ft³ (0.203 kg/dm³) at a higher temperature.

Example 19–21

Polyol 31 was reacted with Iso A resulting in a foam having a wet density of 18.7 lb/ft³ (0.299 kg/dm³) and a dry density of 23.3 lb/ft³ (0.373 kg/dm³). The viscosity of each component was measured as follows:

| Temp. (° F.) | Polyol Viscosity | Iso Viscosity |
|---|---|---|
| 0 (18° C.) | 5600 | — |
| 10 (−12° C.) | 3400 | 2800 |
| 15 (−9° C.) | 2650 | — |
| 20 (−7° C.) | — | 1200 |
| 30 (−1° C.) | 1700 | 990 |
| 40 (4° C.) | 1230 | 840 |
| 60 (16° C.) | 530 | 290 |
| 77 (25° C.) | 285 | 170 |
| 90 (32° C.) | 190 | 105 |

Polyol 31 was combined with 1 wt % zinc stearate and reacted with Iso A to produce a foam having a dry density of 19.9 lb/ft³ (0.318 kg/dm³) and a wet density of 10.2 lb/ft³ (0.163 kg/dm³).

Polyol 31 was also reacted with Iso A at ambient temperature with 60 lb of pressure resulting in a wet density of 16.5 lb/ft³ (0.264 kg/dm³) and a dry density of 19.2 lb/ft³ (0.307 kg/dm³).

Example 22

Polyol 33, having an initial viscosity of 1325 cPs was reacted with Iso K resulting in a gel time of 20 seconds and a density of about 25 lb/ft³ (0.40 kg/dm³).

Example 23

Polyol 36 was reacted with Iso H resulting in a gel time of 20 second and a foam having an initial density of 15.6 lb/ft³ (0.250 kg/dm³).

Example 24

Polyol 37 was reacted with uncompounded PAPI 27 to produce a foam.

Example 25

Polyol 38, having an initial viscosity of 460 cPs at ambient temperature and a viscosity of 6400 cPs at 0° C., was reacted with Iso F, having an initial viscosity at ambient temperature of 440 cPs and a viscosity of 5600 cPs at 0° C. The composition had a gel time of 20 seconds at ambient temperature and 50 seconds at 0° C.

Example 26

Polyol 40 was reacted with Iso C resulting in a foam having a dry density at 130° F. (54° C.) of 20.8 lb/ft³ (0.333 kg/dm³).

Example 27

Polyol 40 was reacted with Iso F resulting in a foam having a dry density at 130° F. (54° C.) of 28.7 lb/ft³ (0.459 kg/dm³ and a wet density of 21.9 lb/ft³ (0.350 kg/dm³).

Example 28

Polyol 43 was modified with the addition of 6.2 wt % Voranol 230-660 and 2.0 wt % Amicure PACM gelling agent. The polyol component, having an initial viscosity of 240 cPs, was reacted with Iso K to produce a less rigid foam. The dry density was 19.3 lb/ft³ (0.309 kg/dm³) whereas the wet density was 29.3 lb/ft³ (0.469 kg/dm³). Although this material is surmised not to have sufficient strength to be suitable for repair of railroad ties, it would be suitable for other applications such as cushioning for docks.

TABLE I

Polyol Component

| Table 1 Ingredient | Trade Name (Supplier, Location) | Generic Chemical Description | 1 | 2 | 3 | 4 | 5 | 6 | 7 | 8 | 9 | 10 | 11 |
|---|---|---|---|---|---|---|---|---|---|---|---|---|---|
| Polyols | Castor Oil AA | Castor Oil | | | 96 | | 95 | 78.975 | 23 | | | 29.6 | |
| | #1 Castor | Castor Oil | 71.8 | 65.4 | | 92.625 | | | | 72.75 | | | 57.3 |
| | D B Castor | Castor Oil | | | | | | | | | 62.4 | | |
| | Voranol 230-238 | Triol Polyether Polyol EW236 | | | | | | | 16.2 | | | 15 | |
| | Voranol 240-770 | 4-Functional Amine based Polyether Polyol | | | | | | | 29.4 | | | 29.3 | |
| | Poly BD 605 | Hydroxyl Terminated Polybutadiene Resin | | | | | | | 10 | | | | |
| Blowing Agent | Water | Water | | | | 0.2 | 0.175 | 0.2 | 0.175 | 0.3 | | 0.2 | |
| Catalysts | Ancamine K-54 | Tertiary Amine | | 0.4 | | | | | | | 0.4 | | 0.4 |
| | Dabco 33-LV | Tertiary Amine in DPG | | | | | | | | 1.5 | | | 2 |
| | Dabco T-120 | Tin Catalyst | 0.2 | 0.5 | | 0.3 | 0.2 | 0.2 | 0.5 | 0.27 | 0.5 | | 0.6 |
| | Polycat 41 | Tertiary Amine | 2 | 1.5 | 0.45 | 2.25 | 1.35 | 2.25 | | 2.025 | 1.5 | | 1.5 |
| | Polycat 43 | Tertiary Amine | 0.2 | 0.2 | 0.05 | 0.25 | 0.15 | 0.25 | | 0.2025 | 0.2 | | 0.2 |
| Additives | Harcross BK-5099 | Black Iron Oxide | 0.5 | | | 0.6 | 0.6 | 0.6 | 0.6 | 0.54 | | 1.2 | |
| | Nigrosine Base S | Black Dye | 0.3 | 0.5 | | 0.2 | 0.3 | | 0.3 | 0.27 | | | |
| Plasticizers | DNP-Dinonylphenol | Hydrophobic Monofunctional Alcohol | 9 | 5 | | | | | | 9 | 5 | | 5 |
| | Tergitol NP-9 | Modified Nonyl Phenol | | | | | | | | | | | |
| | TXIB | Plasticiser | 10.5 | 20 | | | | | 10 | 10 | 20 | 10 | 17 |
| | Krumbhaar K-1717 | Polyketone Resin | | | | | | 12.75 | | | | | |
| Short Chain Extenders | Ethylene Glycol | Ethylene Glycol | 2 | 3 | 1 | 2 | 0.5 | 2 | 5 | 1.8 | 6 | 8 | |
| | Diproylene Glycol | Diproylene Glycol | | | | | | | | 2 | | 3.2 | 14 |
| | 99.5% Glycerin | 99.5% Glycerin | | | | | | | | | | | |
| | 99.7% Glycerin | 99.7% Glycerin | | | | | 0.5 | | | | | | |
| Surfactants | Dow Corning DC-193 | Silicone Glycol | 1.5 | 1.5 | 1.5 | 1.5 | 1.5 | 1.5 | 1.5 | 1.35 | 1.5 | 1.5 | 1.5 |
| Gelling Agent | Hardener HY-450 | Aromatic amine | 2 | 2 | | | | | 1 | 1.8 | 2 | | 2 |
| Geling Agent | Amicure PACM | Cycloaliphatic Amine | | | | | 2 | | | | | | |
| NCO/OH | | | 2.85 | 2.82 | 2.79 | 2.75 | 2.59 | 2.77 | 1.13 | 2.90 | 2.20 | 1.02 | 2.20 |

TABLE II

| Trade Name | 12 | 13 | 14 | 15 | 16 | 17 | 18 | 19 | 20 |
|---|---|---|---|---|---|---|---|---|---|
| Castor Oil AA | 19.6 | 20.8 | | 89.725 | | 20.8 | | | 23 |
| #1 Castor | | | 65.4 | | 62.4 | | 94.3 | 71.8 | |
| D B Castor | | | | | | | | | |
| Voranol 230-238 | 15 | 15 | | | | 15 | | | 16.2 |
| Voranol 240-770 | 29.3 | 29.3 | | | | 29.4 | | | 29.4 |
| Poly BD 605 | 10 | 10 | | | | 10 | | | 10 |
| Water | 0.2 | 0.2 | | 0.175 | | 0.2 | 0.2 | 0.5 | 0.8 |
| Ancamine K-54 | | | 0.4 | | 0.4 | | | | |
| Dabco 33-LV | 2 | 1.4 | | | | 1.4 | | | 1.5 |
| Dabco T-120 | | | 0.5 | 0.2 | 0.5 | | 0.2 | 0.2 | |
| Polycat 41 | | | 1.5 | 2.25 | 1.5 | | 1.8 | 2 | |
| Polycat 43 | | | 0.2 | 0.25 | 0.2 | | 0.2 | 0.2 | |
| Harcross BK-5099 | 1.2 | 0.6 | | 0.6 | | 0.6 | 0.6 | 0.5 | 0.6 |
| Nigrosine Base S | | | 0.5 | 0.3 | 0.5 | | 0.2 | 0.3 | |
| DNP-Dinonylphenol | | | 5 | | 5 | | | 9 | |
| Tergitol NP-9 | | | | | | | | | |
| TXIB | 10 | 10 | 20 | | 20 | 10 | | 10 | 10 |
| Krumbhaar K-1717 | | | | | | | | | |
| Ethylene Glycol | 8 | 8 | 3 | | 6 | 8 | 1 | 2 | 5 |
| Dipropylene Glycol | 3.2 | 3.2 | | 5 | | 3.2 | | | 2 |
| 99.5% Glycerin | | | | | | | | 0.75 | |
| 99.7% Glycerin | | | | | | | | | |
| Dow Corning DC-193 | 1.5 | 1.5 | 1.5 | 1.5 | 1.5 | 1.5 | 1.5 | 1.5 | 1.5 |
| Hardener HY-450 | | | 2 | | 2 | | 2 | | |
| NCO/OH | 1.02 | 1.01 | 2.81 | 2.51 | 2.21 | 1.01 | 2.71 | 2.29 | 1.06 |

| Trade Name | 21 | 22 | 23 | 24 | 25 | 26 | 27 | 28 | 29 |
|---|---|---|---|---|---|---|---|---|---|
| Castor Oil AA | | | 23 | | | 18.65 | | 19.6 | |
| #1 Castor | 93.8 | 57.4 | 62.4 | | 80.6 | | 62.4 | | 71.8 |
| D B Castor | | | | | | | | | |
| Voranol 230-238 | | | | 16.2 | | 27.5 | | 15 | |
| Voranol 240-770 | | | | 29.4 | | 30 | | 29.3 | |
| Poly BD 605 | | | | 10 | | | | | |

TABLE II-continued

| | | | | | | | | | |
|---|---|---|---|---|---|---|---|---|---|
| Water | 0.2 | | | 0.3 | 0.2 | | 0.2 | 0.5 | |
| Ancamine K-54 | | 0.4 | | | | 0.4 | | | |
| Dabco 33-LV | | | | 1.5 | | 4 | | 3.5 | |
| Dabco T-120 | 0.2 | 0.5 | 0.4 | 0.5 | 0.3 | 1.5 | 0.5 | | 0.2 |
| Polycat 41 | 1.25 | 1.5 | 2 | | 2.25 | | 1.5 | | 2 |
| Polycat 43 | 1.25 | 0.2 | 0.2 | | 0.225 | | 0.2 | | 0.2 |
| Harcross BK-5099 | 0.6 | | 0.4 | 0.6 | 0.6 | 0.6 | | 1.2 | 0.5 |
| Nigrosine Base S | 0.2 | 0.5 | 0.3 | | 0.3 | 0.3 | | | 0.3 |
| DNP-Dinonylphenol | | 5 | 9 | | 10 | | 5 | 10 | 9 |
| Tergitol NP-9 | | | | | | | | | 0.05 |
| TXIB | | 17 | 20 | 10 | | 5.25 | 20 | 10 | 10 |
| Krumbhaar K-1717 | | | | | | | | | |
| Ethylene Glycol | 1 | | 2 | 5 | 2 | | 6 | 8 | 2 |
| Dipropylene Glycol | | 14 | | 2 | | | | 3.2 | |
| 99.5% Glycerin | | | | | | | | | |
| 99.7% Glycerin | | | | | | | | | |
| Dow Corning DC-193 | 1.5 | 1.5 | 1.5 | 1.5 | 1.5 | 2 | 1.5 | 1.5 | 1.5 |
| Hardener HY-450 | | 2 | 2 | | 2 | | 2 | | 2 |
| NCO/OH | 2.92 | 2.22 | 3.13 | 1.13 | 2.61 | 1.33 | 2.20 | 1.04 | 2.43 |

TABLE III

Polyol Component

| Trade Name | 30 | 31 | 32 | 33 | 34 | 35 | 36 | 37 | 38 | 39 | 40 | 41 | 42 | 43 |
|---|---|---|---|---|---|---|---|---|---|---|---|---|---|---|
| Castor Oil AA | | | | | | 82.625 | | 80.65 | | | | 20.8 | 23 | |
| #1 Castor | 57.4 | 65.4 | 71.8 | 57.3 | 69.75 | | 68.75 | | 71.3 | 64.3 | 71.8 | | | |
| D B Castor | | | | | | | | | | | | | | |
| Voranol 230-238 | | | | | | | | | | | | 15 | 16.7 | 22.1 |
| Voranol 240-770 | | | | | | | | | | | | 29.4 | 29.4 | |
| Poly BD605 | | | | | | | | | | | | 10 | 10 | |
| Water | | | 0.5 | | | 0.175 | 1 | 0.175 | 1 | | | 0.2 | 0.3 | 0.05 |
| Ancamine K-54 | 0.4 | 0.4 | | 0.4 | | | | | | | | | | 0.8 |
| Dabco 33-LV | | | | | | | | | | | | 1.3 | 1.5 | |
| Dabco T-120 | 0.5 | 0.5 | 0.2 | 0.6 | 0.27 | 0.3 | 0.27 | 0.3 | 0.2 | 0.2 | 0.2 | | | 1.2 |
| Polycat 41 | 1.5 | 1.5 | 2 | 1.5 | 2.025 | 2.25 | 2.025 | 2.25 | 2 | 2 | 2 | | | 1.5 |
| Polycat 43 | 0.2 | 0.2 | 0.2 | 0.2 | 0.2025 | 0.225 | 0.2025 | 0.225 | 0.2 | 0.2 | 0.2 | | | 0.2 |
| Harcross BK-5099 | | | 0.5 | | 0.54 | 0.6 | 0.54 | 0.6 | 0.5 | 0.5 | 0.5 | 0.6 | 0.6 | |
| Nigrosine Base S | | 0.5 | 0.3 | 0.5 | 0.27 | 0.3 | 0.27 | 0.3 | 0.3 | 0.3 | 0.3 | | | 0.5 |
| DNP-Dinonylphenol | 5 | 5 | 9 | 5 | 9 | 10 | 9 | 10 | 9 | 9 | 9 | | | 30 |
| Tergitol NP-9 | | | | | | | | | | | | | | |
| TXIB | 17 | 20 | 10 | 17 | 13 | | 13 | | 10 | 20 | 10.5 | 10 | 10 | 20 |
| Krumbhaar K-1717 | | | | | | | | | | | | | | |
| Ethylene Glycol | | 3 | 2 | | 1.8 | 2 | 1.8 | 2 | 2 | 2 | 2 | 8 | 5 | |
| Diproylene Glycol | 14 | | | 14 | | | | | | | | 3.2 | 2 | 14 |
| 99.5% Glycerin | | | | | | | | | | | | | | |
| 99.7% Glycerin | | | | | | | | | | | | | | |
| Dow Corning DC-193 | 1.5 | 1.5 | 1.5 | 1.5 | 1.35 | 1.5 | 1.35 | 1.5 | 1.5 | 1.5 | 1.5 | 1.5 | 1.5 | 1.5 |
| Hardener HY-450 | 2 | 2 | 2 | 2 | 1.8 | | 1.8 | 2 | 2 | 2 | 2 | | | |
| Amicure PACM | | | | | | | | | | | | | | 2 |
| NCO/OH Ratio | 2.20 | 2.82 | 2.42 | 2.21 | 2.98 | 2.54 | 2.19 | 2.47 | 2.11 | 3.13 | 2.85 | 1.01 | 1.13 | 2.08 |

TABLE IV

Polyol Components

| Ingredient | 44 | 45 | 46 | 47 | 48 | 49 | 50 | 51 | 52 | 53 | 54 | 55 |
|---|---|---|---|---|---|---|---|---|---|---|---|---|
| Eastman TXIB | 9.50 | 10.05 | 10.05 | 10.05 | 10.00 | 12.00 | 12.00 | 12.00 | 12.00 | 10.00 | 10.00 | 10.00 |
| Dipropylene Glycol | 6.00 | 7.00 | 7.00 | 7.00 | — | 5.00 | 5.00 | 5.00 | 5.00 | 6.17 | 6.60 | 7.00 |
| Dinonyl phenol | 5.00 | 6.00 | 6.00 | 6.00 | 6.00 | 4.00 | 4.00 | 4.00 | 4.00 | 5.00 | 5.00 | 6.00 |
| Foamkill 8D | 0.01 | 0.01 | 0.01 | 0.00 | 0.01 | 0.01 | 0.01 | 0.01 | 0.01 | 0.01 | 0.01 | 0.01 |
| Carpol GP-700 | 26.00 | — | — | — | — | — | — | — | — | 25.00 | 25.00 | — |
| Carpol PGP-1000 | 37.00 | — | — | — | — | — | — | — | — | 38.00 | 38.00 | — |
| Voranol 230-238 | — | 26.10 | 26.10 | 26.10 | 26.00 | — | — | — | — | — | — | 26.00 |
| Voranol 230-112 | — | 36.07 | 36.07 | 36.07 | 36.00 | — | — | — | — | — | — | 36.00 |
| Pol G-30-240 | — | — | — | — | — | 30.73 | 26.00 | 30.75 | 26.00 | — | — | — |
| Pol G-30-112 | — | — | — | — | — | 30.25 | 34.00 | 30.25 | 34.00 | — | — | — |
| Water | 0.20 | 0.23 | 0.23 | 0.23 | 0.23 | 0.40 | 0.40 | 0.40 | 0.40 | 0.21 | 0.21 | 0.23 |
| Jeffamine D-230 | 8.75 | — | 7.75 | — | — | 9.00 | 9.00 | 9.00 | 9.00 | 8.50 | 8.25 | 7.92 |

TABLE IV-continued

| Ingredient | \multicolumn{12}{c}{Polyol Components} |
|---|---|---|---|---|---|---|---|---|---|---|---|---|
|  | 44 | 45 | 46 | 47 | 48 | 49 | 50 | 51 | 52 | 53 | 54 | 55 |
| Polycat 43 | 0.75 | 0.80 | 0.80 | 0.80 | 0.80 | 1.00 | 0.25 | 1.00 | 0.25 | 0.75 | 0.75 | 0.80 |
| Dabco T45 | 0.38 | 0.40 | 0.40 | 0.40 | 0.40 | 0.50 | — | 0.50 | — | 0.38 | 0.38 | 0.40 |
| Blue Dye | 0.01 | 0.01 | 0.01 | 0.01 | 0.01 | 0.01 | 0.01 | 0.01 | 0.01 | 0.01 | 0.01 | 0.01 |
| Surfactant-LK-443 | 1.00 | 1.00 | 1.00 | 1.00 | 1.00 | 1.00 | 1.00 | — | — | 1.00 | 1.00 | 1.00 |
| Jeffamine T-403 | 2.60 | — | — | — | — | 2.50 | 2.50 | 2.50 | 2.50 | 2.40 | — | — |
| Amicure PACM | 2.40 | — | — | — | — | 2.50 | 2.50 | 2.50 | 2.50 | 2.40 | — | — |
| Dabco T-120 | 0.60 | 0.25 | 0.25 | 0.25 | 0.30 | 0.90 | 0.90 | 0.90 | 0.90 | 0.40 | 0.30 | 0.30 |
| Jaffamine D-400 | — | 7.75 | — | 7.75 | 14.92 | — | — | — | — | — | — | — |
| T403/PACM 50/50 | — | 4.60 | 4.60 | 4.60 | 4.60 | — | — | — | — | — | 4.70 | 4.60 |
| Ancamine K54 | — | — | — | — | — | 0.60 | 0.60 | 0.60 | 0.60 | — | — | — |
| Surfactant-DC-193 | — | — | — | — | — | — | — | 1.00 | 1.00 | — | — | — |
| Polycat 41 | — | — | — | — | — | — | 1.50 | — | 1.50 | — | — | — |
| NCO/OH | 2.00 | 2.00 | 2.00 | 2.00 | 2.60 | 2.17 | 2.24 | 2.17 | 2.24 | 2.01 | 1.99 | 1.96 |

TABLE V

Isocyanate Component

| No. | Poly BD 605 | Eastman TXIB | PAPI 27 | PAPI 20 |
|---|---|---|---|---|
| A | 5 |  | 95 |  |
| B |  | 12.5 |  | 87.5 |
| C |  | 10 |  | 90 |
| D | 10 |  | 90 |  |
| E |  | 5 |  | 95 |
| F |  | 15 |  | 85 |
| G |  | 16 | 84 |  |
| H |  | 3 |  | 97 |
| I |  | 5 | 95 |  |
| J |  | 20 |  | 80 |
| K |  | 5 | 70 | 25 |

Example 29

Polyol 44 was reacted with Iso K at 110° F. (42° C.) resulting in a foam having a wet density of 32.3 lb/ft$^3$ (0.518 kg/dm$^3$) and a dry density of 32.4 lb/ft$^3$ (0.519 kg/dm$^3$) The crosslinking gel time was about 10 to about 15 seconds.

Example 30

Polyol 45 was reacted with Iso K at 110° F. (42° C.) resulting in a foam having a wet density of 27.5 lb/ft$^3$ (0.441 kg/dm$^3$) and a dry density of 27.8 lb/ft$^3$ (0.446 kg/dm$^3$). The crosslinking gel time was about 15 to about 20 seconds for a dry foam and about 30 seconds for a wet foam, as water absorbed heat from exothermic reaction, thereby slowing down the crosslinking gel time.

Example 31

Polyol 46 was reacted with Iso K resulting in a foam having a wet density of 30.4 lb/ft$^3$ (0.487 kg/dm$^3$) and a dry density of 29.7 lb/ft$^3$ (0.476 kg/dm$^3$). The crosslinking gel time for a dry foam was about 12 to about 15 seconds.

Example 32

Polyol 47 was reacted with Iso K resulting in a foam having a wet density of 22.4 lb/ft$^3$ (0.359 kg/dm$^3$) and a dry density of 26.3 lb/ft$^3$ (0.421 kg/dm$^3$). The crosslinking gel time of a dry foam was about 20 to about 25 seconds.

Example 33

Polyol 48 was reacted with Iso K resulting in a foam having a wet density of 33.9 lb/ft$^3$ (0.543 kg/dm$^3$) and a dry density of 34.1 lb/ft$^3$ (0.546 kg/dm$^3$).

Example 34

Polyol 49 was reacted with Iso K resulting in a foam having a dry density of 37.6 lb/ft$^3$ (0.603 kg/dm$^3$). The foam was then subject to heat aging at 158° F. (70° C.) for three weeks. The foam density measured after aging test was 37.8 lb/ft$^3$ (0.606 kg/dm$^3$) showing the very high storage stability of the foam.

Example 35

Polyol 50 was reacted with Iso K resulting in a foam having a dry density of 37.4 lb/ft$^3$ (0.600 kg/dm$^3$). The foam was then subject to heat aging at 158° F. (70° C.) for three weeks. The foam density measured after aging test was 37.9 lb/ft$^3$ (0.607 kg/dm$^3$).

Example 36

Polyol 51 was reacted with Iso K resulting in a foam having a dry density of 37.6 lb/ft$^3$ (0.603 kg/dm$^3$). The foam was then subject to heat aging at 158° F. (70° C.) for three weeks. The foam density measured after aging test was 39.2 lb/ft$^3$ (0.628 kg/dm$^3$).

Example 37

Polyol 52 was reacted with Iso K resulting in a foam having a dry density of 37.6 lb/ft$^3$ (0.603 kg/dm$^3$). The foam was then subject to heat aging at 158° F. (70° C.) for three weeks. The foam density measured after aging test was 37.9 lb/ft$^3$ (0.607 kg/dm$^3$).

Example 38

Polyol 53 was reacted with Iso K resulting in a foam having a wet density of 27.8 lb/ft$^3$ (0.446 kg/dm$^3$) and a dry density of 32.2 lb/ft$^3$ (0.516 kg/dm$^3$).

Example 39

Polyol 54 was reacted with Iso K resulting in a foam having a wet density of 28.5 lb/ft$^3$ (0.457 kg/dm$^3$) and a dry density of 26.9 lb/ft$^3$ (0.431 kg/dm$^3$).

Example 40

Polyol 55 was reacted with Iso K resulting in a foam having a wet density of 29.7 lb/ft$^3$ (0.476 kg/dm$^3$) and a dry density of 26.9 lb/ft$^3$ (0.431 kg/dm$^3$).

We claim:

1. A foamable composition comprising at least two parts:
   a) a first part comprising at least one polyol that does not contain an ester linkage; at least one thixotropic gelling agent; at least one blowing agent; at least one urethane reaction catalyst; and at least one isocyanurate reaction catalyst, and
   b) a second part comprising at least one isocyanate,
   wherein said blowing agent is present in an amount of from about 0.05 wt % to about 1 wt %, based on the total weight of said first part.

2. The composition of claim 1, wherein said thixotropic gelling agent is selected from thixotropic gelling agents that provide instant thixotropic gelling.

3. The composition of claim 2, wherein said thixotropic gelling agent is a primary polyamine.

4. The composition of claim 3, wherein said primary polyamine is a linear aliphatic polyamine.

5. A foamable composition comprising at least two parts:
   a) a first part comprising at least one polyol that does not contain an ester linkage; at least one thixotropic gelling agent; at least one blowing agent; at least one urethane reaction catalyst; and at least one isocyanurate reaction catalyst, and
   b) a second part comprising at least one isocyanate,
   wherein said thixotropic gelling agent is present in an amount of from about 10 wt % to about 25 wt %, based on the total weight of said first part.

6. The composition of claim 5, wherein said thixotropic gelling agent is present in an amount of from about 12 wt % to about 15 wt %, based on the total weight of said first part.

7. The composition of claim 1, wherein said polyol is selected from the groups consisting of polyethers, polythioethers, hydroxy-terminated polybutadienes, dimer diols, and mixtures thereof.

8. The composition of claim 1, wherein said polyol is not hydrophobic.

9. The composition of claim 1, further comprising at least one plasticizer.

10. The composition of claim 1, wherein said composition is foamable in the presence of environmental water or under water.

11. The composition of claim 1, wherein said composition, upon foaming under water, exhibits wet foam density that is substantially the same as dry foam density.

12. The composition of claim 1, wherein the ratio of isocyanate groups in said second part to active hydrogen atoms in said first part (NCO/OH) is from about 1.5 to about 4.

13. The composition of claim 12, wherein the ratio of isocyanate groups in said second part to active hydrogen atoms in said first part (NCO/OH) is from about 2 to about 4.

14. The composition of claim 1, wherein said composition exhibits, upon machine mixing said first part with said second part, an instant thixotropic gelling in no greater than about 5 seconds.

15. The composition of claim 1, wherein said composition exhibits, upon machine mixing said first part with said second part, a crosslinking gel in no greater than about 30 seconds once said composition forms a thixotropic gel.

16. The composition of claim 1, wherein the viscosity of each part is less than about 10,000 cPs at 50° F. (10° C.).

17. The composition of claim 1, wherein each of the first part and the second part is a liquid at a temperature of less than about 30° F. (−1° C.).

18. A method of repair or reinforcement of a structural member having a void, comprising
   a) applying the composition of claim 1 to said void;
   b) allowing said composition to more rapidly adhere to the inner surface of the void as provided by the thixotropic gelling action of said thixotropic gelling agent, and
   c) sealing said void.

19. The method of claim 18, wherein said composition is applied at a temperature of from about −20° F. (−29° C.) to about 120° F. (49° C.).

20. The method of claim 18, wherein said structure member is in an aqueous environment.

21. The method of claim 18, wherein said void is under water.

22. A method of foaming a composition underwater comprising:
   a) submerging an exit port of an applicator in an aqueous environment; and
   b) applying the composition of claim 1 to a substrate submerged in said aqueous environment.

23. A foam mass prepared by a method of mixing said first part and said second part of the composition of claim 1 at an effective stoichiometric ratio.

24. The foam mass of claim 23, wherein said foam mass exhibits a strength (G') of no less than about $1 \times 10^6$ dynes/cm$^2$.

25. The composition of claim 1, wherein said blowing agent is present in an amount of from about 0.15 wt % to about 1 wt %.

26. The composition of claim 1, wherein said composition exhibits, upon cure, a foam density of greater than about 5 lb/ft$^3$.

27. The composition of claim 5, wherein said thixotropic gelling agent is selected from thixotropic gelling agents that provide instant thixotropic gelling.

28. The composition of claim 5, wherein said thixotropic gelling agent is a primary polyamine.

29. The composition of claim 5, wherein said primary polyamine is a linear aliphatic polyamine.

30. The composition of claim 5, wherein said polyol is selected from the groups consisting of polyothers, polythioethers, hydroxy-terminated polybutadienes, dimer diols, and mixtures thereof.

31. The composition of claim 5, wherein said polyol is not hydrophobic.

32. The composition of claim 5, further comprising at least one plasticizer.

33. The composition of claim 5, wherein said composition is foamable in the presence of environmental water or under water.

34. The composition of claim 5, wherein said composition, upon foaming under water, exhibits wet foam density that is substantially the same as dry foam density.

35. The composition of claim 5, wherein the ratio of isocyanate groups in said second part to active hydrogen atoms in said first part (NCO/OH) is from about 1.5 to about 4.

36. The composition of claim 35, wherein the ratio of isocyanate groups in said second part to active hydrogen atoms in said first part (NCO/OH) is from about 2 to about 4.

37. The composition of claim 5, wherein said composition exhibits, upon machine mixing said first part with said second part, an instant thixotropic gelling in no greater than about 5 seconds.

38. The composition of claim 5, wherein said composition exhibits, upon machine mixing said first part with said second part, a crosslinking gel in no greater than about 30 seconds once said composition forms a thixotropic gel.

39. The composition of claim 5, wherein the viscosity of each part is less than about 10,000 cPs at 50° F. (10° C.).

40. The composition of claim 5, wherein each of the first part and the second part is a liquid at a temperature of less than about 30° F. (−1° C.).

41. A method of repair or reinforcement of a structural member having a void, comprising a) applying the composition of claim 5 to said void;

b) allowing said composition to more rapidly adhere to the inner surface of the void as provided by the thixotropic gelling action of said thixotropic gelling agent, and c) sealing said void.

42. The method or claim 41, wherein said composition is applied at a temperature of from about −20° F. (−29° C.) to about 120° F. (49° C.).

43. The method of claim 41, wherein said structure member is in an aqueous environment.

44. The method of claim 41, wherein said void is under water.

45. A method of foaming a composition underwater comprising:

a) submerging an exit port of an applicator in an aqueous environment; and b) applying the composition of claim 5 to a substrate submerged in said aqueous environment.

46. A foam mass prepared by a method of mixing said first part and said second part of the composition of claim 5 at an effective stoichiometric ratio.

47. The foam mass of claim 46, wherein said foam mass exhibits a strength (G') of no less than about $1 \times 10^6$ dynes/cm$^2$.

* * * * *

UNITED STATES PATENT AND TRADEMARK OFFICE
CERTIFICATE OF CORRECTION

PATENT NO.   : 6,455,605 B1
DATED        : September 24, 2002
INVENTOR(S)  : Albert M. Giorgini and James A. Hagquist It is certified that error appears in the above-identified patent and that said Letters Patent is hereby corrected as shown below:

Column 26,
Line 40, "The composition of claim 5" should be -- The composition of claim 28 --.

Signed and Sealed this

Eighth Day of April, 2003

JAMES E. ROGAN
*Director of the United States Patent and Trademark Office*